United States Patent
Schulte

(10) Patent No.: US 8,642,928 B2
(45) Date of Patent: Feb. 4, 2014

(54) TEMPERATURE CONTROL FOR COOKING APPLIANCE INCLUDING COMBINATION HEATING SYSTEM

(75) Inventor: Robert A. Schulte, Williamsburg, IA (US)

(73) Assignee: ACP, Inc., Cedar Rapids, IA (US)

(*) Notice: Subject to any disclaimer, the term of this patent is extended or adjusted under 35 U.S.C. 154(b) by 831 days.

(21) Appl. No.: 12/681,956

(22) PCT Filed: Oct. 9, 2008

(86) PCT No.: PCT/US2008/079393
§ 371 (c)(1),
(2), (4) Date: Jul. 8, 2010

(87) PCT Pub. No.: WO2009/049077
PCT Pub. Date: Apr. 16, 2009

(65) Prior Publication Data
US 2010/0282097 A1 Nov. 11, 2010

Related U.S. Application Data

(60) Provisional application No. 60/960,661, filed on Oct. 9, 2007.

(51) Int. Cl.
*A21B 1/26* (2006.01)

(52) U.S. Cl.
USPC ............... 219/400; 126/21 A; 126/273 R

(58) Field of Classification Search
USPC ......... 219/391–396, 398, 400, 417, 678–685, 219/690, 691, 702, 715
See application file for complete search history.

(56) References Cited

U.S. PATENT DOCUMENTS

| | | | |
|---|---|---|---|
| 4,332,992 A | 6/1982 | Larsen et al. | |
| 4,384,850 A * | 5/1983 | Dixon | 432/72 |
| 5,434,390 A | 7/1995 | McKee et al. | |
| 6,060,701 A | 5/2000 | McKee et al. | |
| 6,333,492 B1 | 12/2001 | Graves et al. | |
| 6,624,390 B1 | 9/2003 | Motakef et al. | |
| 6,936,794 B2 | 8/2005 | Zhang et al. | |
| 7,009,147 B1 | 3/2006 | Schulte | |
| 7,166,821 B2 | 1/2007 | Adamski | |
| 7,235,763 B2 | 6/2007 | Christiaansen et al. | |
| 2005/0115413 A1 | 6/2005 | Kim et al. | |
| 2005/0258171 A1 | 11/2005 | Witt | |
| 2006/0081623 A1 | 4/2006 | Cho | |
| 2006/0169272 A1 * | 8/2006 | McFadden et al. | 126/21 A |
| 2007/0068935 A1 | 3/2007 | Furlanetto et al. | |

* cited by examiner

*Primary Examiner* — Brian Jennison
(74) *Attorney, Agent, or Firm* — Diederiks & Whitelaw, PLC

(57) ABSTRACT

A combination cooking appliance controls a radiant heating element provided in an oven cavity and a convection heating element provided in an air plenum with a regulating system which receives signals from multiple temperature sensors. More specifically, the appliance includes a first temperature sensor provided in an air return plenum portion for controlling the radiant heating element and a second temperature sensor arranged in a discharge air plenum portion, preferably downstream of a catalyst, for controlling the convection heating element. The heating elements are independently controlled based on the sensed temperatures to establish a desired oven cavity temperature, while accommodating for temperature fluctuations due to the incoming fresh air stream.

20 Claims, 4 Drawing Sheets

TEMPERATURE CONTROL FOR COOKING APPLIANCE INCLUDING COMBINATION HEATING SYSTEM

CROSS-REFERENCE TO RELATED APPLICATIONS

This application represents a National Stage application of PCT/US2008/079393 entitled "Temperature Control for Cooking Appliance Including Combination Heating System" filed Oct. 9, 2008, pending, which claims the benefit of U.S. Provisional Patent Application Ser. No. 60/960,661 entitled "Temperature Control for Cooking Appliance Including Combination Heating System" filed Oct. 9, 2007.

BACKGROUND OF THE INVENTION

1. Field of the Invention

The present invention pertains to the art of cooking appliances and, more particularly, to a compact cooking appliance capable of combining multiple heating techniques under a regulating temperature control to perform various cooking operations.

2. Discussion of the Prior Art

There exists a wide range of cooking appliances on the market. Many of these cooking appliances are designed for use in cooking various types of food products in different ways. For instance, where more conventional cooking appliances generally relied upon radiant energy as the sole heat source, more recent trends combine a radiant heat source with convection or microwave heating techniques, thereby increasing the versatility of the cooking appliance while potentially shortening required cook times. In particular, the prior art contains many examples of at least appliances that combine radiant and convection cooking, as well as combination convection and microwave cooking, techniques.

Regardless of the existence of these known arrangements, there still exists a need for a cooking appliance that employ multiple heating techniques in an efficient and effective manner to handle a wide range of food items. Particularly, there exists a need for a cooking appliance that can be used to rapidly prepare food products that require numerous different heat sources for full and complete cooking in an expedited manner. For example, the rapid preparation of commercially produced, open-faced grilled sandwiches raises various cooking concerns. Open-faced grilled sandwiches generally require, at the very least, that heat be directed both downward onto an upper portion of the sandwich and upward onto a lower bun portion of the sandwich. In most cases this is accomplished by passing the open-faced sandwich on a conveyor belt through an oven between opposing radiant heat sources. While effective to a degree, the process can be time consuming and really does not result in a uniform heating of the meat, cheese and/or other toppings on the bread, nor an even toasting of the bread itself.

In addition, a dual radiant oven of the type described above is simply not suitable for many other applications. For instance, an additional microwave oven or the like would typically be employed to heat soup or other liquid-based food items. To address this and other concerns, it has also been proposed in the prior art to combine each of radiant, convection and microwave energy sources in a compact, versatile cooking appliance. Such a prior art arrangement is disclosed, for example, in U.S. Pat. No. 7,235,763.

Regardless of the variety of known cooking appliances, room exists to provide for enhanced controls of a combination cooking appliance such that a wide range of food items can be rapidly and effectively cooked. The invention addresses these concerns by providing a combined heating system with an enhanced regulating temperature-based control system in a combination cooking appliance to enhance the overall efficiency and effectiveness of the appliance.

SUMMARY OF THE INVENTION

The present invention is directed to a cooking appliance including an oven cavity having top, bottom, rear and opposing side walls, a door for selectively accessing the oven cavity, at least one radiant heating element exposed to the oven cavity, a blower having a convection fan, an additional convection heating element directly exposed to an airflow generated by the convection fan and, preferably, multiple microwave heating devices. Behind a rear plate of the oven cavity is established an air return plenum portion for directing a return flow of air from the oven cavity to the blower. The cooking appliance also includes a discharge plenum portion which extends above the oven cavity enabling a convection air stream to flow from the convection fan, across a catalyst and into the oven cavity through a plurality of downwardly exposed nozzles. An exhaust tube opens to the discharge plenum and projects into one end portion of an enlarged, downwardly and rearwardly extending exhaust duct. The air from the exhaust tube merges with a cooling air stream established in the cooking appliance about the oven cavity, while additional fresh intake air directly enters the oven cavity about the door.

The present invention is particularly concerned with controlling the heating elements of the combination cooking appliance with a regulating system which receives signals from multiple temperature sensors to provide for multiple cooking modes. More specifically, a first temperature sensor is provided in the air return plenum portion and a second temperature sensor is arranged in the discharge air plenum portion, preferably downstream of the catalyst. The various heating elements are independently controlled based on sensed temperatures to establish a desired oven cavity temperature, while accommodating for temperature fluctuations due to the incoming fresh air stream. Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
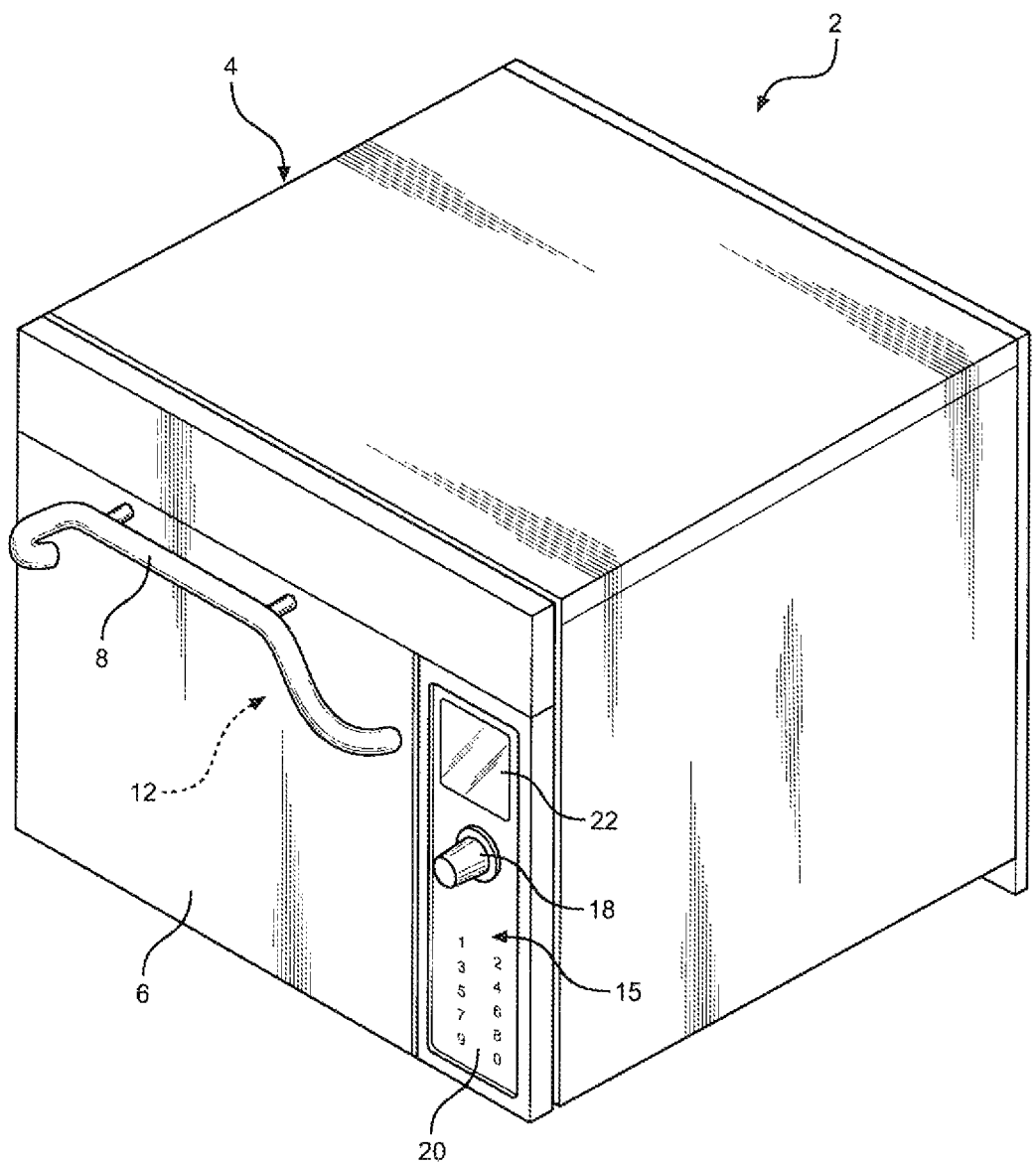
FIG. 1 is an upper right perspective view of a cooking appliance incorporating a combination heating system constructed in accordance with the present invention.

With initial reference to FIG. 1, a cooking appliance constructed in accordance with the present invention is generally indicated at 2. As will be discussed more fully below, cooking appliance 2 constitutes a combination cooking appliance which preferably employs radiant, convection and microwave heating techniques to rapidly and effectively cook a wide range of food items. As shown, cooking appliance 2 includes a cabinet 4 and a door 6 that is provided with a handle 8. In the preferred embodiment shown, door 6 is pivotally mounted about a lower horizontal axis such that handle 8 can be utilized to open door 6 in order to access an internal oven cavity 12. However, a vertical pivoting arrangement, or another type of door opening system, could be readily employed. Cooking appliance 2 also includes a is programming interface 15 which is shown to include a control knob 18, a key pad 20 and a touch pad display 22.

Figure 2:
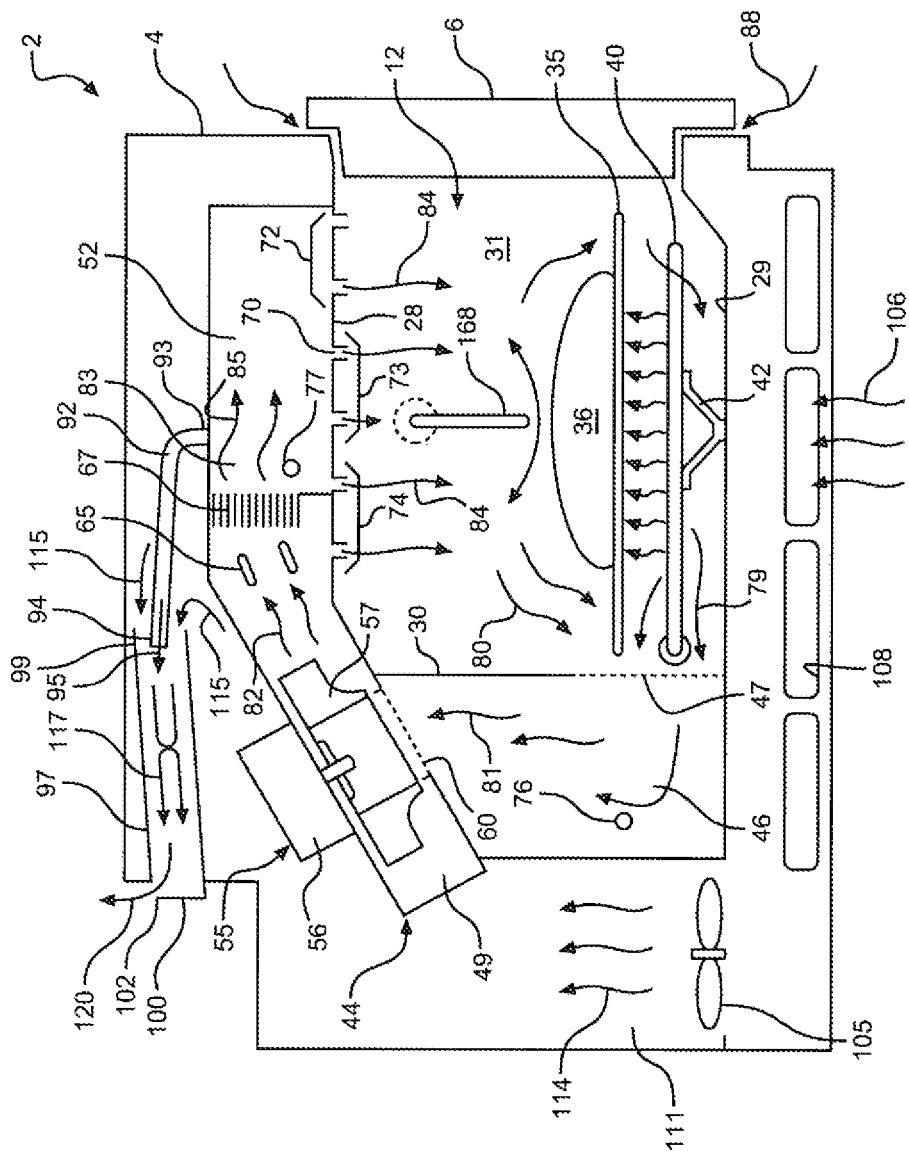
FIG. 2 is a schematic side view of the cooking appliance constructed in accordance with the present invention.

As perhaps best illustrated in the schematic side view of FIG. 2, oven cavity 12 includes top, bottom, rear and opposing side walls 28-31. Mounted within oven cavity 12 is an oven rack 35 which, in the preferred embodiment, constitutes a metal wire rack used to support a food item 36 during cooking. The use of a metal wire rack is desired in order to allow effective air flow around food item 36, while also providing a fairly open support area such that the food item 36 can be radiantly heated from below. As depicted, oven rack 35 is spaced from bottom wall 29 to allow for a sufficient volume of air to flow past the food item 36 such that convection heating can be utilized for both the top and bottom of the food item 36, while also promoting even browning on both the top and bottom. Arranged between oven rack 35 and bottom wall 29 is a radiant heating element 40. More specifically, a support 42 is provided to retain radiant heating element 40 at a substantially intermediate position between bottom wall 29 and oven rack 35. In the most preferred embodiment shown, a single radiant heating element 40 is employed, with radiant heating element 40 being constituted by a sheathed, resistive-type heating element. However, at this point, it should be recognized that multiple radiant heating elements of varying designs can be employed in connection with the invention.

Extending about at least the rear and upper portions of oven cavity 12 is an air plenum 44. More specifically, air plenum 44 includes a return plenum portion 46 which is arranged behind and at least partially defined by rear wall 30. Rear plenum portion 46 has associated therewith an air intake 47 which is defined by a plurality of spaced openings located in rear wall 30 of oven cavity 12. In the most preferred embodiment shown, the plurality of openings extend from above rack 35 to below radiant heating element 40. Air plenum 44 also includes a blower plenum portion 49 and a discharge plenum portion 52. Mounted in blower plenum portion 49 is a blower 55 that includes an electric motor 56 and a fan or impeller unit 57. Blower plenum portion 49 is in fluid communication with return plenum portion 46 through a plurality of openings 60 which leads to a central intake portion of fan unit 57.

Downstream of blower 55, essentially at the juncture of blower plenum portion 49 and discharge plenum portion 52, is a convection heating element 65. Although convection heating element 65 can take various forms, it is preferred to employ a sheathed electric heating unit. Mounted directed adjacent convection heating element 65 is a catalyst unit 67. In a manner known in the art, catalyst unit 67 functions to chemically breakdown airborne byproducts associated with cooking operations. Given the relative position between convection heating element 65 and catalyst unit 67, convection heating element 65 advantageously functions to heat catalyst unit 67 and maintain its temperature at or above a minimum temperature required for proper function of the catalyst.

As clearly shown in these figures, discharge plenum portion 52 is provided with a plurality of nozzles 70 which are spaced along top wall 28 and fluidly interconnect discharge plenum portion 52 with oven cavity 12. In the preferred embodiment shown, the plurality of nozzles 70 are essentially grouped in a first or foremost region 72, a second or intermediate region 73, and a third or aft region 74. As depicted, a portion of the plurality of nozzles 70 located in third region 74 are located prior to catalyst 67, while the remainder of the plurality of nozzles 70 at each of first, second and third regions 72-74 are arranged downstream of catalyst 67. For use in connection with controlling operating temperatures within oven cavity 12, a first temperature sensor 76 is provided within return plenum portion 46 and a second temperature sensor 77 is provided within discharge plenum portion 52. In the most preferred embodiment shown, second temperature sensor 77 is provided directly adjacent catalyst unit 67.

With the above arrangement, operation of blower 55 will create a circulating air flow into and out of oven cavity 12. More specifically, a return flow constituted by a lower flow 79 going below oven rack 35 and an upper flow 80 going over food item 36 will be drawn in to return plenum portion 46 through the plurality of openings 47 of the air intake. This return air, generally indicated at 81, will flow by first temperature sensor 76 and be directed into fan unit 57 through openings 60. Through operation of fan unit 57, the return air flow 81 will be redirected radially outwardly as convection air stream 82. Air stream 82 will be heated upon flowing across convection to heating element 65, with a portion of the convection air stream 82 flowing directly into oven cavity 12 at the various nozzles 70 (see air streams 84) arranged in third region 74 prior to catalyst 67, while a majority of the air flow will flow across catalyst 67 as indicated at 85. The air stream 85 will then flow through the remainder of the plurality of nozzles 70 in the first-third regions 72-74 and back into oven cavity 12, with the air flowing around food item 36 prior to the flow cycle being repeated.

In accordance with the most preferred embodiment of the invention, oven cavity 12 is not completely sealed. Instead, during operation of cooking appliance 2, a low pressure is established within oven cavity 12 and a certain amount of ambient air is drawn into oven cavity 12 around door 6, as indicated at 88. In addition to providing a certain amount of fresh air for the cooking operation, the ambient air stream 88 advantageously functions to reduce door temperature. Based on the desire to allow ambient air 88 into oven cavity 12, cooking appliance 2 also employs an exhaust system wherein a small amount of the generally recirculated air is exhausted. More specifically, the exhaust system includes an exhaust tube 92 having a first end 93 opening up into discharge plenum portion 52 and a second end 94 which terminates at a predetermined location within cavity 4. With this arrangement, the recirculated air utilized for cooking has a portion thereof which is lead into exhaust tube 92 so as to define a cooking exhaust stream generally indicated at 95. The overall exhaust system also includes an exhaust mixing tube 97 having a first end 99 which preferably encompasses and yet is radially spaced from second end 94 of exhaust tube 92. That is, first end 99 of exhaust mixing tube 97 preferably has an enlarged diametric dimension relative to second end 94 of exhaust tube 92, with exhaust mixing tube 97 also having associated therewith a second end 100 having an upwardly opening exit 102.

Also included in connection with cooking appliance 2 is a cooling system arranged within cabinet 4. More specifically, a cooling fan 105 is mounted behind return plenum portion 46. Operation of cooling fan 105 is functions to draw a flow of cooling air 106 into cabinet 4, such as through cabinet openings 108. The cooling air 106 is directed by cooling fan 105 through a rear chamber 111 to establish a cooling exhaust stream indicated at 114. Cooling exhaust stream 114 flows about and cools motor 56, as well as various electronic components (not shown), and then around second end 94 of exhaust tube 92 as indicated at 115. This cooling exhaust stream 115 then flows into exhaust mixing tube 97 at first end 99 and mixes with cooking exhaust stream 95 to establish a mixed exhaust stream indicated at 117. Actually, the provision for the cooling air flow creates an elevated pressure in cabinet 4, about oven cavity 12. The cooling exhaust stream 115 flows at a relatively high speed into exhaust mixing tube 97 such that a suction is created which draws cooking exhaust stream 95 into exhaust mixing tube 97. Mixed exhaust stream 117 is then lead through exhaust mixing tube 97 and out upwardly opening exit 102 as a final exhaust 120. Further details of the air flow arrangement can be found in copending U.S. patent application entitled "Air Circuit for Cooking Appliance Including Combination Heating System" filed on even date herewith and incorporated herein by reference.

Figure 3:
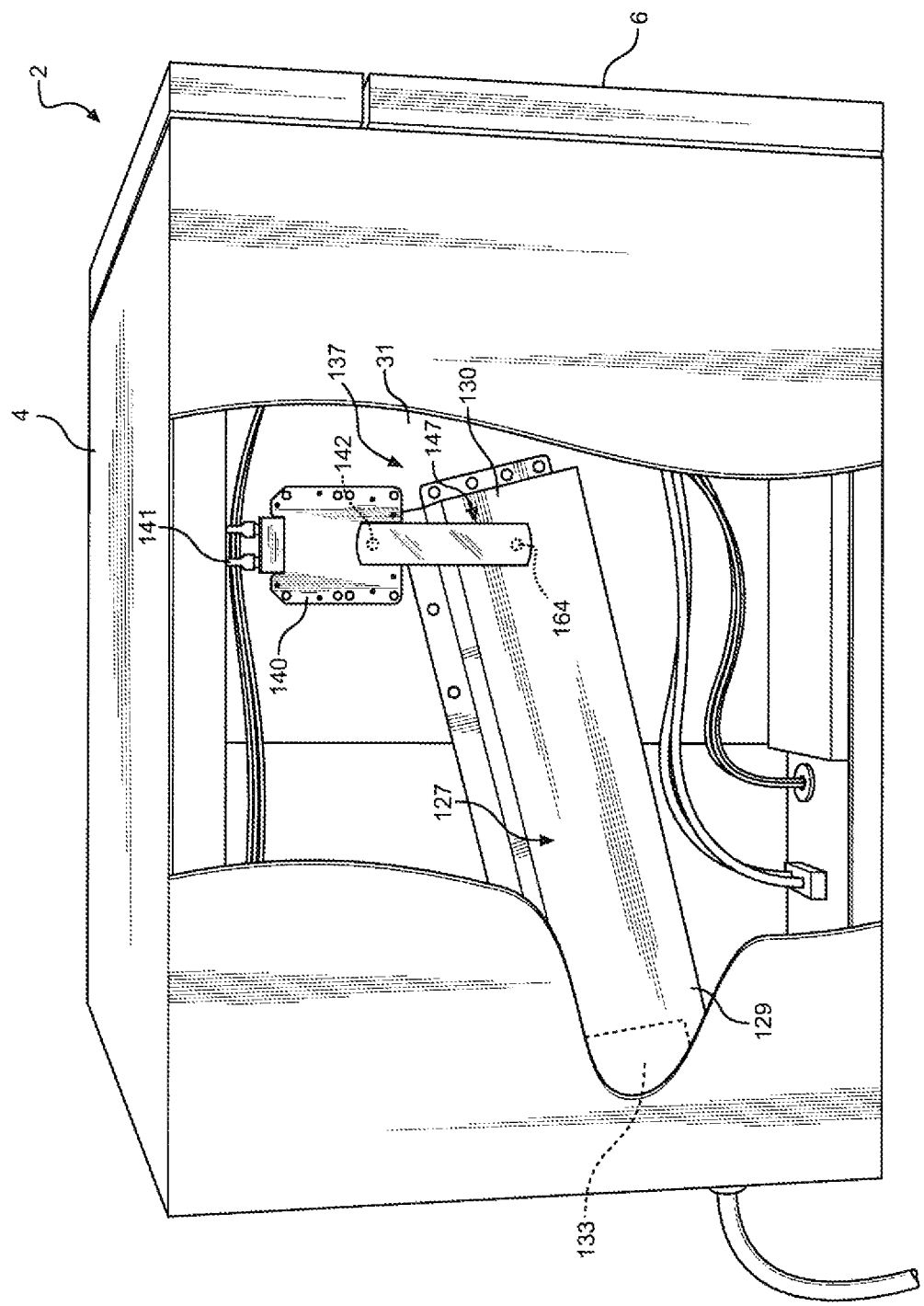
FIG. 3 is a partial cut-out side view of the cooking appliance of FIG. 1.

With the arrangement discussed above, cooking appliance 2 can be employed to cook food items utilizing both radiant and convection cooking techniques. However, it is also desired to further incorporate microwave cooking techniques. To this end, as best shown in FIG. 3, cooking appliance 2 is also provided with a pair of wave guides mounted along opposing side walls 31, with one of the waveguides being indicated at 127. Basically, the arrangement on each side of oven cavity 12 is preferably, identically constructed such that reference will be made in detailing one side arrangement. In any case, in connection with the microwave system employed, waveguide 127 includes a first end portion 129 and a second end portion 130. Generically indicated at 133 is a magnetron for generating microwaves which propagate through waveguide 127 and are lead into oven cavity 12. At second end portion 130 is provided a stirrer assembly generally indicated at 137. In the preferred embodiment shown, stirrer assembly 137 includes a motor housing 140 to which is applied electric current through wires 141. Motor housing 140 has associated therewith a rotatable output shaft 142 linked to a mechanism 147 for transferring the rotation of output shaft 142 to a drive member 164. Drive member 164 is fixed for rotation to a rotatable stirrer 168 (see FIG. 2) which is mounted behind a respective side wall 31. Further details of the microwave supply and distribution arrangement is not part of the invention but rather can be found in copending U.S. patent application entitled "Combination Cooking Appliance Including Multiple Microwave Heating Units With Rotatable Antennae" filed on even date herewith and incorporated herein by reference. In the most preferred embodiment, the overall microwave system is designed to introduce microwaves from both of opposing side walls 31 at a position close to top wall 28. This arrangement is considered to at least facilitate the use of metal pans by introducing the microwave energy into the oven cavity at a position wherein the metal pans will not block the microwave energy from reaching the food load. In any case, the stirrers 168 provided on side walls 131 further enhance the distribution of the microwaves for oven cavity 12.

Figure 4:
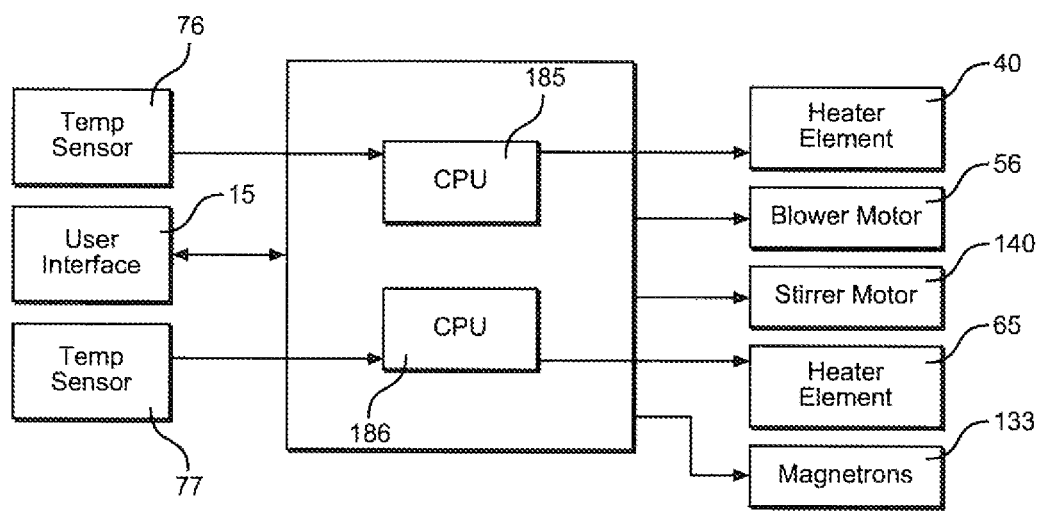
FIG. 4 is a schematic of a control arrangement employed in connection with the present invention.

With the above construction, cooking appliance 2 can operate in various modes including: microwave only mode; bake mode; combination bake and convection mode; and full combination mode with microwave, radiant, and hot air convection for high speed food cooking. As the operational mode details are not part of the present invention, they will not be further discussed herein. Instead, reference is made to copending U.S. patent application entitled "Cooking Appliance Including Combination Heating System" filed on even date herewith and incorporated herein by reference. In any case, the present invention is particularly concerned with the manner in which the temperature is controlled in cooking appliance 2. As outlined above, cooking appliance 2 incorporates heating elements 40 and 65 to maintain cavity temperature. In accordance with one aspect of the invention, heating elements 40 and 65 are individually controlled. In general, the temperature in oven cavity 12 is hard to maintain reliably, mainly because of ambient air 88 leaking into low pressure oven cavity 12 through door 6 lowers the cavity temperature from the convection air stream 84 entering oven cavity 12. Instead of controlling both heating elements 40 and 65 by a single cavity temperature sensor, the invention employs two independent controllers or control systems 185 and 186 (see FIG. 4) for heating elements 40 and 65 respectively, so the convection air stream 84 can be adjusted to compensate for the ambient air mixing and the correct temperature at the point where food item 36 is cooked can be maintained. In particular, by increasing the temperature of convection air stream 84 coming into oven cavity 12, the cooking temperature in oven cavity 12 can be more accurately maintained at a desired set point. In addition, oven cavity temperature recovery following the opening and closing of door 6 is quickened.

As indicated above, second temperature sensor 77 is positioned just after convection heating element 65 in discharge plenum 52 to accurately measure the temperature of air stream 84 entering oven cavity 12. Depending on the cavity set point temperature and the speed of convection air stream 84 based on the rotational speed of fan unit 57, the temperature at sensor 77 is adjusted, with controller 186 altering the power supplied to convection heating element 65 such that the temperature of air stream 84 will be above the set point temperature for oven cavity 12 during a given cooking operation. In this manner, the higher temperature air stream 84 can mix with the ambient air 88 leaking around door 6 such that the temperature of the combined or mixed air streams will be equal to the desired cavity temperature. In addition, first temperature sensor 76 in the return plenum portion 46 sends sensed temperature signals to controller 185 which, in turn, controls radiant heating element 40 in the bottom of oven cavity 12. In this fashion, the mixed air stream in oven cavity 12 is accurately maintained at the desired cavity set point temperature and the return air stream 81 is also at the cavity set point temperature.

Therefore, first temperature sensor 76, radiant heating element 40 and controller 185 constitute a first temperature control system for oven cavity 12 which functions independently of a second temperature control system including second temperature sensor 77, convection heating element 65 and controller 186. With this dual, independently operating arrangement, the cooking temperature in oven cavity 12 will be most accurately maintained at the desired set point temperature. Another benefit of having the convection air stream 84 at a higher temperature than the cavity set point is the ability to recover from a door open condition when food is removed from or placed into oven cavity 12. The relatively cold air drawn into oven cavity 12 when door 6 is open is immediately preheated by radiant heating element 40 before reaching convection heating element 65 so that the resulting temperature for air stream 84 can be established.

The manner in which controllers 185 and 186 operate in accordance with a preferred embodiment of the invention will now be described. When controlling heating elements 40 and 64 to attain and maintain a desired oven cavity temperature, heating elements 40 and 64 are caused to overshoot the desired temperature on the first cycle with an on/off type control. Certainly, a full PID loop control having both proportional and differential control parts could be employed to prevent overshooting, but it is considered nearly impossible to tune properly. Therefore, in accordance with another aspect, the invention employs an on/off control, while also mimicking proportional and differential parts of a PID control arrangement. More specifically, in addition to employing an on/off control for heating elements 40 and 65, various set levels below the set point temperature are established where the power is can be reduced to mimic the proportional part of a pseudo PID control. In addition, a rate of change of the air temperature is determined and utilized to mimic the differential part of a PID loop. The advantage of this scheme is the ability to maintain tight control of the cavity temperature with minimal tuning.

In connection with the various set levels, the set point temperature of the oven cavity is established based on inputs by a user through interface 15. With knowledge of this set point temperature, a number of temperature levels below the set point temperature, through a reduction to the power of heating elements 40 and 65, are established. The power reduction at each of these levels will depend on the distance of the level to the actual set point temperature and the rate at which the actual temperature is approaching the set point temperature. In accordance with a preferred embodiment of the invention, the first reduction in heater power is made at each of the levels below the set point regardless of the direction of temperature change (increasing or decreasing). A second reduction is made depending on a threshold rate at which the actual temperature is increasing when one of the temperature levels below the set point temperature is reached, but does not reduce power when the actual temperature is decreasing through those levels.

In one preferred embodiment, there are two variables for each level below the set point temperature, one for the number of degrees the particular temperature level is below the set point and the second is the percentage of power reduction at that level. The variables for power reduction for each level below the set point temperature are adjusted so the further the particular level is from the set point, the less reduction there is to heater power. In addition, there are preferably two variables for the derivative part, one for the rate at which the temperature must change before instigating a reduction in power and another for the percentage of power reduction to use when the rate of change is above the threshold. This reduction in power is a percentage of the current power level being used. With this arrangement, assuming the temperature is rising quickly through one of the levels, the level reduces power by 50%, the rate of change threshold is met and power reduction is also set at 50%, the total reduction will be 75% or 50% plus 50% of 50%. Therefore, as the rate of temperature increase is reduced by the lowered power level, the power level would increase to the level setting reduction of 50% until the next level is reached.

Based on the above, it should be readily apparent that two temperature control schemes are employed for each of the heating elements 40 and 65 to accurately control the temperature in oven cavity 12. That is, to increase the accuracy of the temperature control as the cavity set point temperature is changed, two sets of variables are employed. One set is adjusted to optimize the control with the cavity at its lowest set point and the other set is adjusted to optimize the control at the highest cavity set point. Then, instead of using these variables directly, the controller linearly interpolates between the two depending on the cavity set point temperature. In particular, each control functions to provide: a) a heater power reduction at a predetermined level below the set point temperature, regardless of whether the cooking temperature is increasing or decreasing; and b) another heater power reduction depending on a threshold rate at which the cooking temperature is increasing when a predetermined level below the set point temperature is reached, but does not reduce heater power when the cooking temperature is decreasing through the predetermined level. At the same time, this arrangement is performed through controllers 185 and 186 for each of heating elements 40 and 65, with separate temperature sensors 76, 77 being provided adjacent the respective heating elements 40, 65 so that accurate information can be fed to the control electronics. The control systems then use the measured temperatures to adjust the heaters in the overall system to quickly bring the oven cavity up to temperature and then to accurately maintain that temperature through predictive interpolation.

Although described with respect to a preferred embodiment of the invention, it should be readily understood that various changes and/or modifications can be made to the invention without departing from the spirit thereof. For instance, although the invention has been described as including two separate controllers, it should be understood that a single controller with multiple, independently operating control systems could be employed. In general, the invention is only intended to be limited by the scope of the following claims.

I claim:

1. A cooking appliance for cooking food items using multiple cooking techniques comprising:
   a cabinet;
   an oven cavity including top, bottom, rear and opposing side walls that collectively define a cooking chamber;
   a user interface for establishing a desired cooking operation for a food item placed in the oven cavity, with the desired cooking operation having an associated set point temperature;
   an oven rack supported in the cooking chamber, said oven rack being spaced from the bottom wall of the oven cavity;
   a radiant heating element positioned below the oven rack and above the bottom wall in the oven cavity;
   a convection heating system including:
   an air plenum including a return plenum portion having an air intake defined by a plurality of openings located in the rear wall of the oven cavity, a blower plenum portion exposed to and downstream of the air plenum, and a discharge plenum portion downstream of the blower plenum, said discharge plenum including a plurality of nozzles opening to the oven cavity above the oven rack;
   a blower positioned in the blower plenum;
   a convection heating element positioned downstream of the blower;
   a first temperature sensor upstream of the blower; and
   a second temperature sensor downstream of the blower, wherein, during operation of the convection heating system, a convection air stream is drawn into the return plenum portion through the plurality of openings, directed across the convection heating element and introduced into the oven cavity through the plurality of nozzles, while being exposed to each of the first and second temperature sensors, through operation of the blower;
   a first control system receiving temperature signals from the first temperature sensor and regulating operation of the radiant heating element; and
   a second control system receiving temperature signals from the second temperature sensor and regulating operation of the convection heating element, wherein the first and second control systems constitute an overall temperature control system for regulating a cooking temperature in the oven cavity based on the temperature signals, said control system functioning to provide: a) a heater power reduction at a predetermined level below the set point temperature, regardless of whether the cooking temperature is increasing or decreasing; and b) another heater power reduction depending on a threshold rate at which the cooking temperature is increasing when a predetermined level below the set point temperature is reached, but does not reduce heater power when the cooking temperature is decreasing through the predetermined level.

2. A cooking appliance for cooking food items using multiple cooking techniques comprising:
   a cabinet;
   an oven cavity including top, bottom, rear and opposing side walls that collectively define a cooking chamber;
   an oven rack supported in the cooking chamber, said oven rack being spaced from the bottom wall of the oven cavity;
   a radiant heating element positioned below the oven rack and above the bottom wall in the oven cavity;
   a convection heating system including:
      an air plenum including a return plenum portion having an air intake defined by a plurality of openings located in the rear wall of the oven cavity, a blower plenum portion exposed to and downstream of the air plenum, and a discharge plenum portion downstream of the blower plenum, said discharge plenum including a plurality of nozzles opening to the oven cavity above the oven rack;
      a blower positioned in the blower plenum;
      a convection heating element positioned downstream of the blower;
      a first temperature sensor upstream of the blower; and
      a second temperature sensor downstream of the blower, wherein, during operation of the convection heating system, a convection air stream is drawn into the return plenum portion through the plurality of openings, directed across the convection heating element and introduced into the oven cavity through the plurality of nozzles, while being exposed to each of the first and second temperature sensors, by operation of the blower;
   a first control system receiving temperature signals from the first temperature sensor and regulating operation of the radiant heating element; and
   a second control system receiving temperature signals from the second temperature sensor and regulating operation of the convection heating element.

3. The cooking appliance according to claim 2, wherein the second control system operates independent of the first control system.

4. The cooking appliance according to claim 2, wherein the first temperature sensor is arranged in the return plenum portion.

5. The cooking appliance according to claim 4, wherein the second temperature sensor is arranged in the discharge plenum portion.

6. The cooking appliance according to claim 2, wherein the plurality of openings extend both above and below the oven rack.

7. The cooking appliance according to claim 2, further comprising: a door attached to the cabinet for providing selective access to the oven cavity, said door permitting a limited flow of ambient air into the oven cavity during operation of the cooking appliance.

8. The cooking appliance according to claim 7, further comprising: an air exhaust having an inlet exposed to the convection air stream and an outlet leading out of the cabinet.

9. A cooking appliance for cooking food items using multiple cooking techniques comprising:
   a cabinet;
   an oven cavity including top, bottom, rear and opposing side walls that collectively define a cooking chamber;
   a user interface for establishing a desired cooking operation for a food item placed in the oven cavity, with the desired cooking operation having an associated set point temperature;
   an oven rack supported in the cooking chamber, said oven rack being spaced from the bottom wall of the oven cavity;
   a radiant heating element positioned below the oven rack and above the bottom wall in the oven cavity;
   a convection heating system including:
      an air plenum including a return plenum portion having an air intake defined by a plurality of openings located in the rear wall of the oven cavity, a blower plenum portion exposed to and downstream of the air plenum, and a discharge plenum portion downstream of the blower plenum, said discharge plenum including a plurality of nozzles opening to the oven cavity above the oven rack;
      a blower positioned in the blower plenum;
      a convection heating element positioned downstream of the blower; and
      at least one temperature sensor, wherein, during operation of the convection heating system, a convection air stream is drawn into the return plenum portion through the plurality of openings, directed across the convection heating element and introduced into the oven cavity through the plurality of nozzles by operation of the blower; and
   a temperature control system for regulating a cooking temperature in the oven cavity based on temperature signals, said control system functioning to provide: a) a heater power reduction at a predetermined level below the set point temperature, regardless of whether the cooking temperature is increasing or decreasing; and b) another heater power reduction depending on a threshold rate at which the cooking temperature is increasing when a predetermined level below the set point temperature is reached, but does not reduce heater power when the cooking temperature is decreasing through the predetermined level.

10. The cooking appliance according to claim 9, wherein the control system employs two variables for a given level below the set point temperature, with a first of the two variables being a number of degrees below the set point temperature and the second of the two variables being a percentage of power reduction for the given level.

11. The cooking appliance according to claim 10, wherein the control system includes means for adjusting the variables for various levels below the set point temperature, wherein a lower reduction to heater power occurs the further the level is from the set point temperature.

12. The cooking appliance according to claim 9, wherein the at least one temperature sensor includes a first temperature sensor upstream of the blower and a second temperature sensor downstream of the blower.

13. The cooking appliance according to claim 12, wherein the convection air stream is exposed to each of the first and second temperature sensors.

14. The cooking appliance according to claim 9, wherein the at least one temperature sensor includes a first temperature sensor and a second temperature sensor, and wherein the control system includes a first control system receiving temperature signals from the first temperature sensor and regulating operation of the radiant heating element and a second control system receiving temperature signals from the second temperature sensor and regulating operation of the convection heating element.

15. In a cooking appliance including a cabinet having an internal oven cavity selectively closed by a door and heated by both radiant and convection heating systems including separate radiant and convection heating elements, a method of controlling power supplied to the heating elements during a cooking operation comprising:
 establishing a set point temperature for the oven cavity;
 using a control system to provide an initial high power level to each of the heating elements to develop a cooking temperature for the oven cavity;
 providing a heater power reduction at a predetermined level below the set point temperature, regardless of whether the cooking temperature is increasing or decreasing; and
 providing another heater power reduction depending on a threshold rate at which the cooking temperature is increasing when a predetermined level below the set point temperature is reached, but not reducing heater power when the cooking temperature is decreasing through the predetermined level.

16. The method of claim 15, further comprising: utilizing two variables for a given level below the set point temperature, with a first of the two variables being a number of degrees below the set point temperature and the second of the two variables being a percentage of power reduction for the given level.

17. The method of claim 16, further comprising:
 adjusting the variables for various levels below the set point temperature; and
 providing a lower reduction to heater power the further a given level is from the set point temperature.

18. The method of claim 17, further comprising: employing a first temperature sensor upstream of a convection blower and a second temperature sensor downstream of the blower for measuring the cooking temperature.

19. The method of claim 17, wherein the control system comprises a first controller and a second controller, and further comprising:
 employing the first controller to receive temperature signals from a first temperature sensor and regulate operation of the radiant heating element; and
 employing the second controller to receive temperature signals from a second temperature sensor and regulate operation of the convection heating element.

20. The method of claim 19, further comprising: operating the first and second controllers to regulate the radiant and convection heating elements independently.

* * * * *